United States Patent [19]

Gilles

[11] 4,444,958

[45] Apr. 24, 1984

[54] FILLED NYLONS

[75] Inventor: Richard C. Gilles, Sinking Spring, Pa.

[73] Assignee: The Polymer Corporation, Reading, Pa.

[21] Appl. No.: 368,230

[22] Filed: Apr. 14, 1982

Related U.S. Application Data

[63] Continuation of Ser. No. 225,789, Jan. 16, 1981, abandoned.

[51] Int. Cl.$^3$ .................... C08G 69/48; C08L 77/00
[52] U.S. Cl. .................................. 525/432; 525/928; 525/929
[58] Field of Search ................ 525/928, 929, 432

[56] References Cited

U.S. PATENT DOCUMENTS

| | | | |
|---|---|---|---|
| 3,592,952 | 7/1971 | Fang | 525/432 |
| 3,862,918 | 1/1975 | Laurent et al. | 525/928 |
| 4,107,125 | 8/1978 | Lovejoy | 260/37 N |

OTHER PUBLICATIONS

Detroit Society for Paint Technology, Powder Coating, J. of Paint Tech., pp. 30–37, vol. 44, No. 565 (1972).

*Primary Examiner*—Melvyn I. Marquis
*Assistant Examiner*—A. L. Carrillo
*Attorney, Agent, or Firm*—Richard O. Church

[57] ABSTRACT

Nylon molding powders are prepared by melt blending a nylon with a minor amount of a heat reactive polyimide resin. The mixture is cooled and ground and mixed with the desired filler. The heat reactive polyimide increases the melt viscosity of the nylon during subsequent melt forming of shapes so that the filler particles are not wet out or their interstices filled leaving them as discrete clusters of filler material held in pockets in the nylon/polyimide matrix. By these means, the filler material is more effective in contributing desired properties to a molded article.

3 Claims, No Drawings

FILLED NYLONS

This is a continuation of application Ser. No. 225,789, filed Jan. 16, 1981, now abandoned.

TECHNICAL FIELD

This invention relates to filled nylon molding powders in which the melt viscosity of the nylon is increased to inhibit the nylon from wetting out and filling the interstices between the filler particles.

BACKGROUND ART

It is known in the prior art that the properties of nylon can be modified by incorporating various finely divided fillers. For example, the friction and wear characteristics of nylon can be improved by adding solid lubricant fillers such as molybdenum disulfide or boron nitride. When thermal or electrical conductivity is desired, conductive fillers such as metal powders or carbon black may be added to the nylon.

It has been found that the effectiveness of fillers of the above type are enhanced if the filler particles are spaced or packed in close relation to each other with only such minimal plastic-to-filler interfaces as are required to maintain structural integrity. Nylons, however, typically have low melt viscosities and they tend to wet out and fill small interstices between filler particles, thus diminishing the effectiveness of the filler in contributing to the desired properties of the nylon.

DISCLOSURE OF THE INVENTION

Accordingly, it is an object of this invention to prepare filled nylon molding powders that maximize the effectiveness of the filler in contributing desired property to articles molded from the nylon molding powders.

Another object of this invention is to increase the melt viscosity of filled nylon molding powders so that when articles are molded, the effectiveness of the filler in contributing desired properties is not unduly diminished.

These and other objects of this invention are achieved by melt blending a major portion of nylon, i.e., at least 90 percent by weight, with a heat reactive polyimide to obtain a friable product having a comparatively high melt viscosity. This melt blend of a nylon and a heat reactive polyimide is ground to a fine or moderately fine powder and the filler material is blended into the nylon/polyimide mixture. It has been found that in subsequent melt forming processes, such as compression molding, the filler particles are not completely wet out or dispersed throughout the nylon/polyimide matrix so that they are retained as small clusters of packed filler materials held in pockets formed in a nylon/polyimide matrix. Since the filler particles are held in clusters and are not thoroughly wet out by the plastic matrix, the fillers are more effective in contributing properties, such as, lubricity and thermal and electrical conductivity.

The term nylon is used herein in its commonly accepted sense of any long chain synthetic polymer having recurring amide groups as integral parts of the main polymer chain and having sufficient molecular weight to be formed into filaments that can be axially oriented.

EXAMPLE

A dry blend comprised of 5 percent by weight of an impregnation grade heat reactive polyimide (Kerimid 601 as sold by Rhodia Corporation) was mixed with 95 percent of a molding grade 6/6 nylon. This mixture was blended in a compounding extruder above the melting points of both the nylon and the polyimide and extruded in the form of thin rods. The extrudate was moderately friable and it was easily ground to pass through a 30 mesh (U.S. standard) screen.

20 percent by weight of finely powdered boron nitride (SRG-225) was mechanically mixed with the ground nylon/polyimide mixture. The mixture so obtained was placed in a cylindrical mold and compression molded into a slug about 2.5 cm in diameter and 6.4 cm long. The compression molding was conducted at a pressure of about 300 kg/cm$^2$ and at a temperature of about 305° C.

Upon visual observation of the slugs so prepared, clusters of the boron nitride particles could readily be observed in the plastic matrix. These clusters are loosely held in pockets and can be removed from an exposed surface with a pointed object. This indicates that all of the filler particles are not being wet out or their interstices filled with the plastic matrix thus preserving the properties of the filler whether it be added, for example, for its lubricating ability, or its thermal or electrical conductivity.

It would appear that during the compression molding of a part, there is little flow of the particles of melt blended nylon/polyimide. Thus, the size of the pockets in the matrix and the clusters of filler materials can be controlled by the fineness of the powder to which the nylon/polyimide blend is ground. It can be understood that the finer the nylon/polyimide is ground, the smaller will be the pockets and vice versa.

I claim:

1. A method for the manufacture of a nylon shape that incorporates a particulate filler and in which the filler particles are not fully wet out by the nylon but instead are held in small clusters within the nylon matrix, the improvement comprising:
   melt mixing at least 90 percent by weight of nylon with less than 10 percent by weight of a heat-reactive polyimide,
   partially curing the polyimide to form an easily ground composite,
   grinding the composite into a molding powder,
   mechanically mixing the particulate filler with the molding powder,
   melt forming the nylon shape from the mechanical mixture, and
   completing the cure of the heat-reactive polyimide.

2. A method according to claim 1 wherein the particulate fillers are selected from the group consisting of solid lubricants and conductive particles.

3. A method according to claim 2 wherein the filler is a solid lubricant selected from the class consisting of molybdenum disulfide and boron nitride.

* * * * *